United States Patent [19]

Kobayashi

[11] Patent Number: 4,995,740

[45] Date of Patent: Feb. 26, 1991

[54] PRINTING DEVICE WITH SPELLING CHECK THAT CONTINUES PRINTING AFTER A DELAY

[75] Inventor: Norio Kobayashi, Nagoya, Japan

[73] Assignee: Brother Kogyo Kabushiki Kaisha, Japan

[21] Appl. No.: 397,745

[22] Filed: Aug. 22, 1989

[30] Foreign Application Priority Data

Aug. 24, 1988 [JP] Japan .................. 63-209713

[51] Int. Cl.⁵ .............................................. B41J 5/30
[52] U.S. Cl. ...................................... 400/63; 400/50;
400/212; 400/695
[58] Field of Search ................. 400/50, 63, 695-697.1,
400/712

[56] References Cited

U.S. PATENT DOCUMENTS

| | | | |
|---|---|---|---|
| 4,574,363 | 3/1986 | Carlgren | 400/63 |
| 4,607,966 | 8/1986 | Neno | 400/63 |
| 4,775,251 | 10/1988 | Suzuki et al. | 400/63 |

FOREIGN PATENT DOCUMENTS 0262804 4/1988 European Pat. Off. ............. 400/63

OTHER PUBLICATIONS

U.S. Ser. No. 142,190 filed on Jan. 6, 1988.

Primary Examiner—David A. Wiecking
Assistant Examiner—Steven S. Kelley
Attorney, Agent, or Firm—Kane, Dalsimer, Sullivan, Kurucz, Levy, Eisele and Richard

[57] ABSTRACT

A printing device that detects misspelled words which contains a counter for counting a period of time after a detection of misspelling of the character string executed by a spelling check and a print controller for controlling a print head member so as to execute print operations in case that a value counted by the counter reaches a predetermined value.

9 Claims, 6 Drawing Sheets

PRINTING DEVICE WITH SPELLING CHECK THAT CONTINUES PRINTING AFTER A DELAY

BACKGROUND OF THE INVENTION

The present invention relates to a printing device having a spelling check function for checking whether a printed word is correctly spelled or not, more particularly, to a printing device further having a function capable of ceasing printing operation and shifting a print ribbon from its print position to its rest position in case that a misspelled word is detected by the spelling check function, so that an operator can easily confirm the misspelled word.

A printing device employed in an electronic typewriter and the like is usually provided with a print mechanism including a carriage horizontally movable which is supporting a print head and a print ribbon and effects printing operation on a printing medium such as a print sheet and the like through the print ribbon in response to the data inputted through an input unit such as a keyboard or the like.

This print device is sometimes provided with a ribbon lift mechanism which shifts the print ribbon from a print position (upper position) at which the print ribbon is confronting the print head to a rest position (lower position) at which the print ribbon is not confronting the print head to enable characters and the like printed to be visually confirmed. In many cases, this type of the printing device is usually provided with a print ribbon drive control mechanism so that the print ribbon is kept at the print position while data are continuously inputted and the print ribbon is kept at the rest position when the data input operation is interrupted.

The printing device having the above spelling check function is provided with a dictionary memory storing spelling data of many words in advance in such a printing device having the above ribbon lift mechanism and a spelling check operation for checking whether words are correctly spelled or not by searching the dictionary memory is executed.

Conventionally, by the above spelling check operations, it is determined that a word is incorrectly spelled, an occurrence of the incorrect spelling is generally informed to an operator by generating an alarm or the like. When, however, the alarm based upon incorrect spelling is generated, the operator sometimes has been already effected the succeeding operations. In this case, since the print ribbon is kept in the print position, there is a problem in that the operator is difficult to confirm the portion of the word which is incorrectly spelled.

SUMMARY OF THE INVENTION

It is therefore an object of the invention to provide an improved printing device having a function capable of detecting an incorrect spelling having been printed on a print sheet and controlling a print ribbon so as to be shifted from its print position to its rest position so that an operator can easily confirm the misspelled word.

For this purpose, according to the invention, there is provided a printing device comprising input means for inputting character data, print means including a print head member movable along a print line on a print sheet, for executing print operations through a print ribbon in response to the inputted character data, said printing device further comprises: shift means for shifting the print ribbon in a vertical direction between its print position and its rest position; dictionary memory means for storing spelling information of a multiplicity of words; spelling check means for checking the spelling of a character string defined in a predetermined manner and having been printed on the print sheet, by retrieving the words stored in the dictionary memory means; and first control means for controlling the shift means so as to shift the print ribbon from the print position to the rest position in case that word whose spelling is equal to the character string checked by the spelling check means is not stored in said dictionary memory means.

DESCRIPTION OF THE EMBODIMENTS

An embodiment of this invention applied to an electronic typewriter will be described below with reference to drawings.

Figure 1:
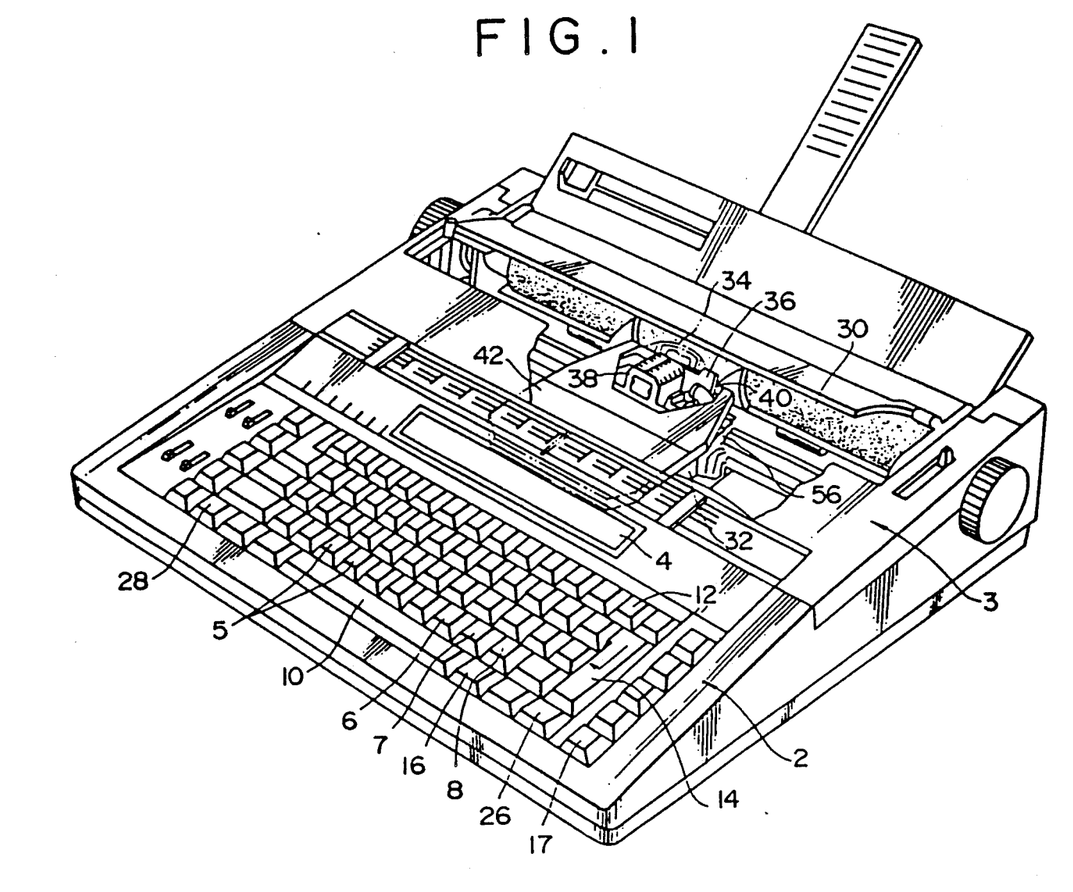
FIG. 1 is a perspective view of a typewriter incorporating a printing device according to the present invention.

An electronic typewriter shown in FIG. 1 is provided with a keyboard 2, a print mechanism 3 and a liquid crystal display 4 having a predetermined number of lines display for displaying characters or symbols interposed therebetween. The keyboard 2 is provided with a plurality of keys 5 for inputting data, such as character keys, numeral keys, symbol keys and the like and many function keys such as a period key 6, a comma key 7, a colon key 8, a space key 10, a back space key 12, a return key 14, a correction key 16 and the like.

The print mechanism 3 is provided with a platen 30 also serving as a paper feed roller and a carriage 32 moving along the platen 30. The carriage 32 has a wheel cassette 36 for accommodating a type wheel (daisy wheel) 34, a print hammer and solenoid for driving the print hammer 38, a ribbon cassette 42 for accommodating a print ribbon 40 and the like mounted thereon.

Figure 2:
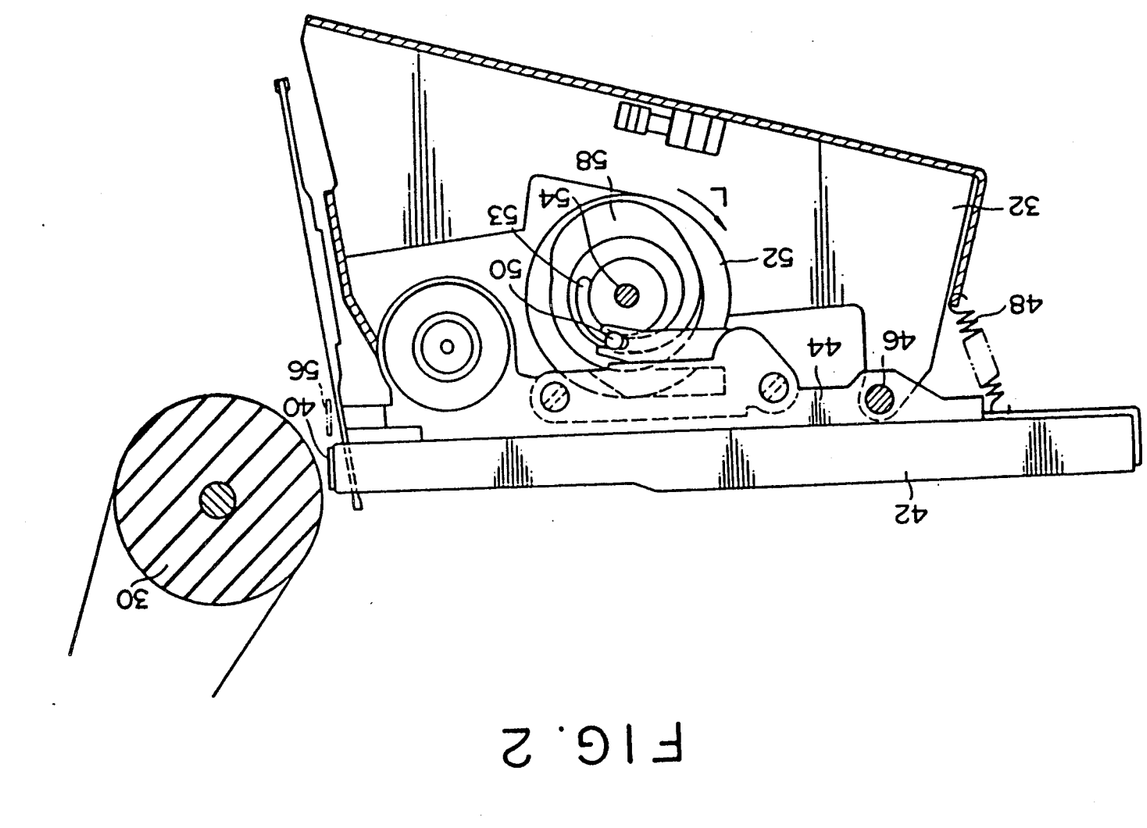
FIG. 2 is a cross-sectional view of a print mechanism employed in the printing device of FIG. 1.

As shown in FIG. 2, the ribbon cassette 42 is mounted on the holder 44. The holder 44 is mounted by a shaft 46 in parallel to the platen 30 in such a manner that it is rotatable about the shaft 46. Then, a portion of the print ribbon 40 exposed from the ribbon cassette 42 can be shifted between a position confronting a print head of the carriage 32, i.e., a print position confronting a print line of the platen 30 and a rest position apart downward therefrom. Although the holder 44 is urged by a stretching spring 48 in the counterclockwise direction "L" indicated by an arrow in FIG. 2, i.e., in the direction directed to the print position of the print ribbon 40, a cam follower 50 integrally formed with the holder 44 is engaged with a cam groove 53 of a ribbon lift cam 52. The ribbon lift cam 52 is pivotally mounted on the carriage 32 through a shaft 54 and driven by a ribbon lift cam driver motor 109. That is, the clockwise rotation of the ribbon lift cam 52 in FIG. 2 enable the print ribbon 40 to be shifted from the rest position to the print position by an urging force of the stretching spring 48 and the counterclockwise rotation of the ribbon lift cam 52 in FIG. 2 enables the print ribbon 40 to be shifted from the print position to the rest position against the urging force of the spring 48.

Note that in this embodiment, a correction ribbon 56 is disposed below the print ribbon 40 by being supported by the holder 44 and can be wound between a pair of spools, not shown, and when a printed character is to be corrected, the correction ribbon 56 can confront the platen 30. More specifically, although the counterclockwise rotation of the holder 44 in FIG. 2 is regulated to the print position by a stopper, not shown, at which the print ribbon 40 confronts the platen 30 in a normal print operation, the regulation of the stopper is released by, for example, a solenoid, a cam integrally formed with the ribbon lift cam 52 or the like in a correcting print operation to enable the cam groove 58 of the ribbon cam lift 52 is engaged with the cam follower 50 so that the correction ribbon 56 confronts the platen 30.

Figure 3:
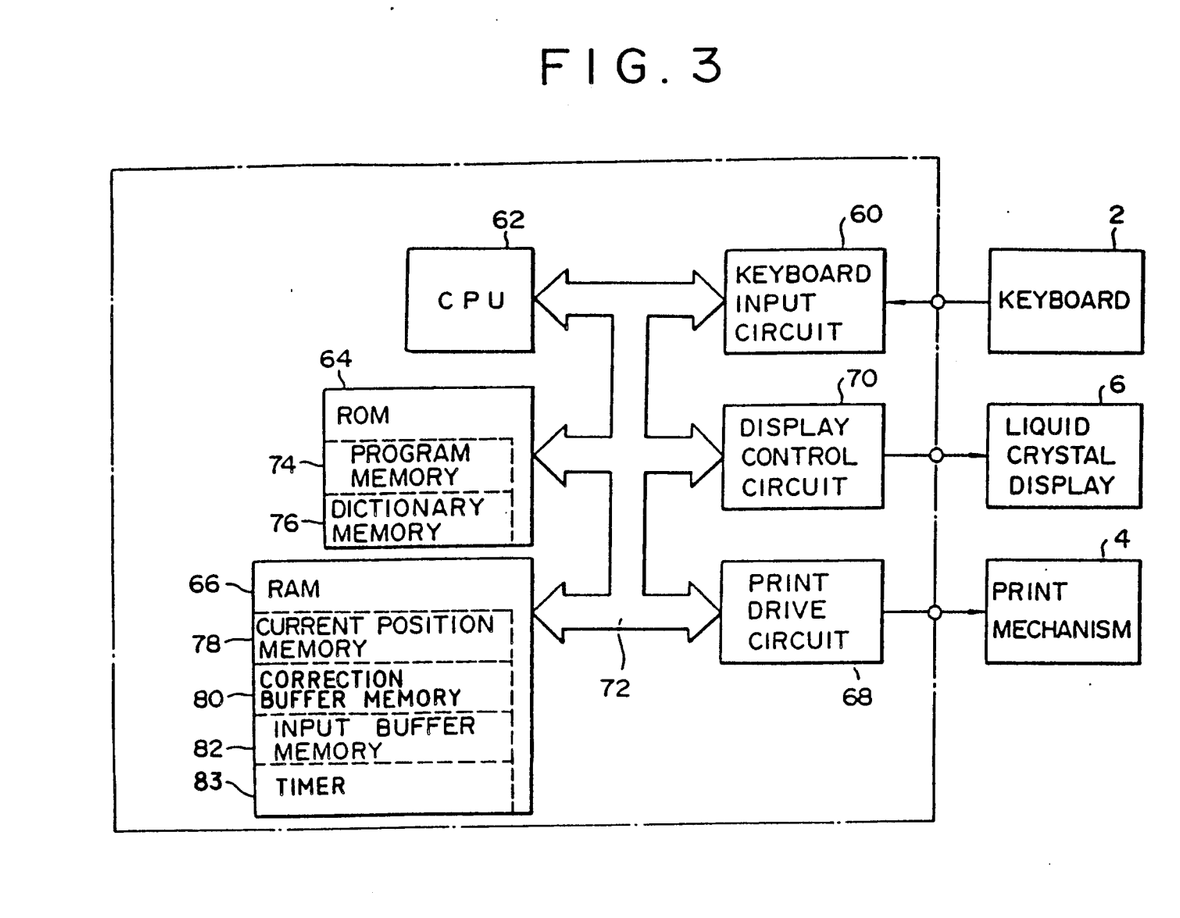
FIG. 3 is a block diagram of a control system employed in the typewriter of FIG. 1.

The control circuit of the typewriter of FIG. 1 will be described with reference to the block diagrams of FIG. 3 and FIG. 4.

The keyboard 2 is electrically connected to a known CPU (Central Processing Unit) 62 through a keyboard input circuit 60 and a key code corresponding to a key operated by the keyboard 2 is supplied to the CPU 62. The CPU 62 is further connected to a ROM (Read Only Memory) 64, a RAM (Random Access Memory) 66, a print drive circuit 68 and a display control circuit 70 through a common bus line 72 each other in addition to the keyboard input circuit 60.

The ROM 64 is provided with a dictionary memory 76 in addition to a program memory 74 for storing various control programs of the typewriter. The dictionary memory 76 stores data regarding the spelling of, example, 70,000 words, to check the spelling of an input word, the data being alphabetically classified like an usual dictionary.

This typewriter can be set with a typewriter mode wherein a character is printed almost simultaneously with the data input thereon through the keyboard 2 and a memory mode wherein the prescribed number of data are temporarily stored and characters corresponding to the data are printed together by the operation of a print instruction key 17 instead of being printed at once. The RAM is provided with a current position memory 78 which sequentially updates and stores the present position of the carriage 32 from the absolute starting position in correspondence to the print position of the carriage 32 in the typewriter mode, a correction buffer memory 80 which sequentially stores the prescribed number of printed character data in correspondence to the print position, an input memory 82 for temporarily storing data inputted from the keyboard 2 in the memory mode as well as necessary memories, registers and the like.

Figure 4:
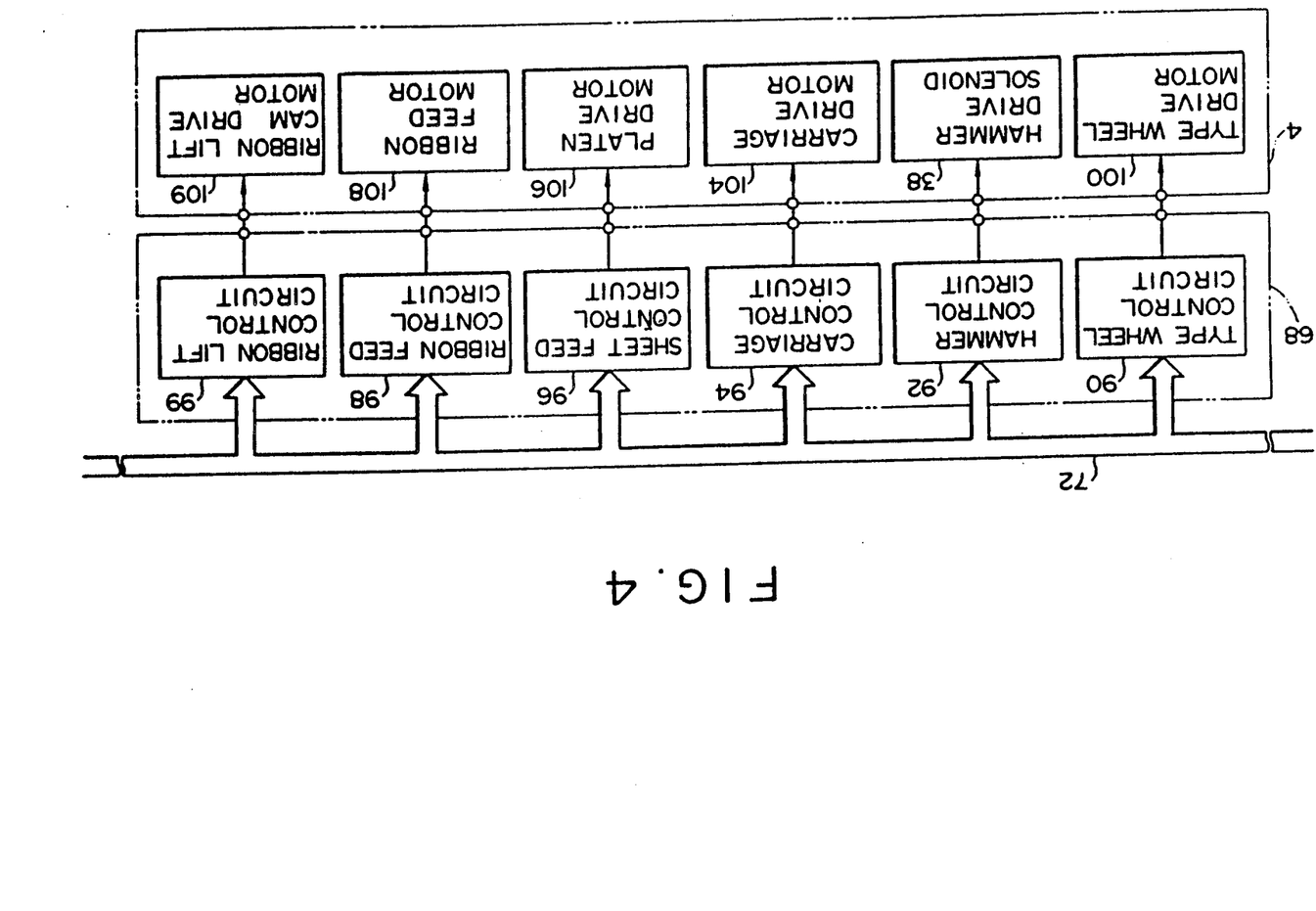
FIG. 4 is a detailed block diagram of a printing drive circuit employed in the typewriter of FIG. 1.

Further, as shown in FIG. 4, there are provided drive motors 106, 104 and 100 for respectively driving the platen 30, the carriage 32 and the type wheel 34, and a motor 108 for winding the print ribbon 40. The print drive control circuit 68 controls the operation of the carriage 32, the type wheel 34, the holder 44 which supports the ribbon cassette 42 and the like in response to a carriage movement signal supplied from the CPU 62 and a type selection signal corresponding to a character to be printed. More specifically, as shown in FIG. 4, the above print drive circuit 68 comprises a type wheel control circuit 90, a sheet feed control circuit 96, a ribbon feed control circuit 98, and a ribbon lift control circuit 99. These circuits respectively control the operation of the type wheel drive motor 100 composing the drive system of the print mechanism 3, the hammer drive solenoid 38, the carriage drive motor 104, the platen drive motor 106, the ribbon feed motor 108, and the ribbon lift cam drive motor 109.

The display control circuit 70 is a unit for causing the liquid crystal display 4 to display characters and the like, provided with a character generator storing many character dot patterns corresponding to character code data and connected to the liquid crystal display 4.

Figure 5A:
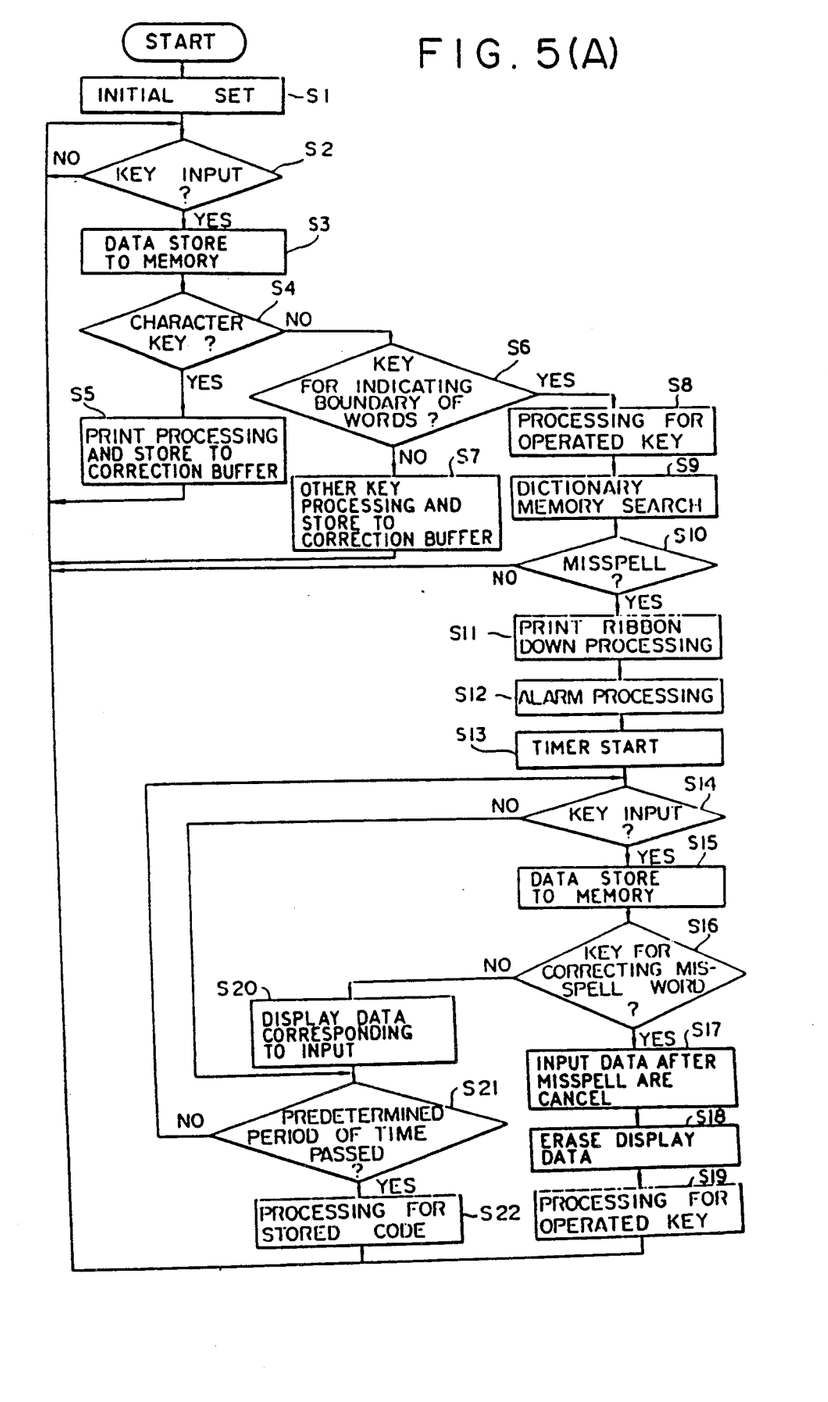
FIG. 5(A) and (B) are flowcharts of a program for controlling the printing device according to the present invention.
Figure 5B:
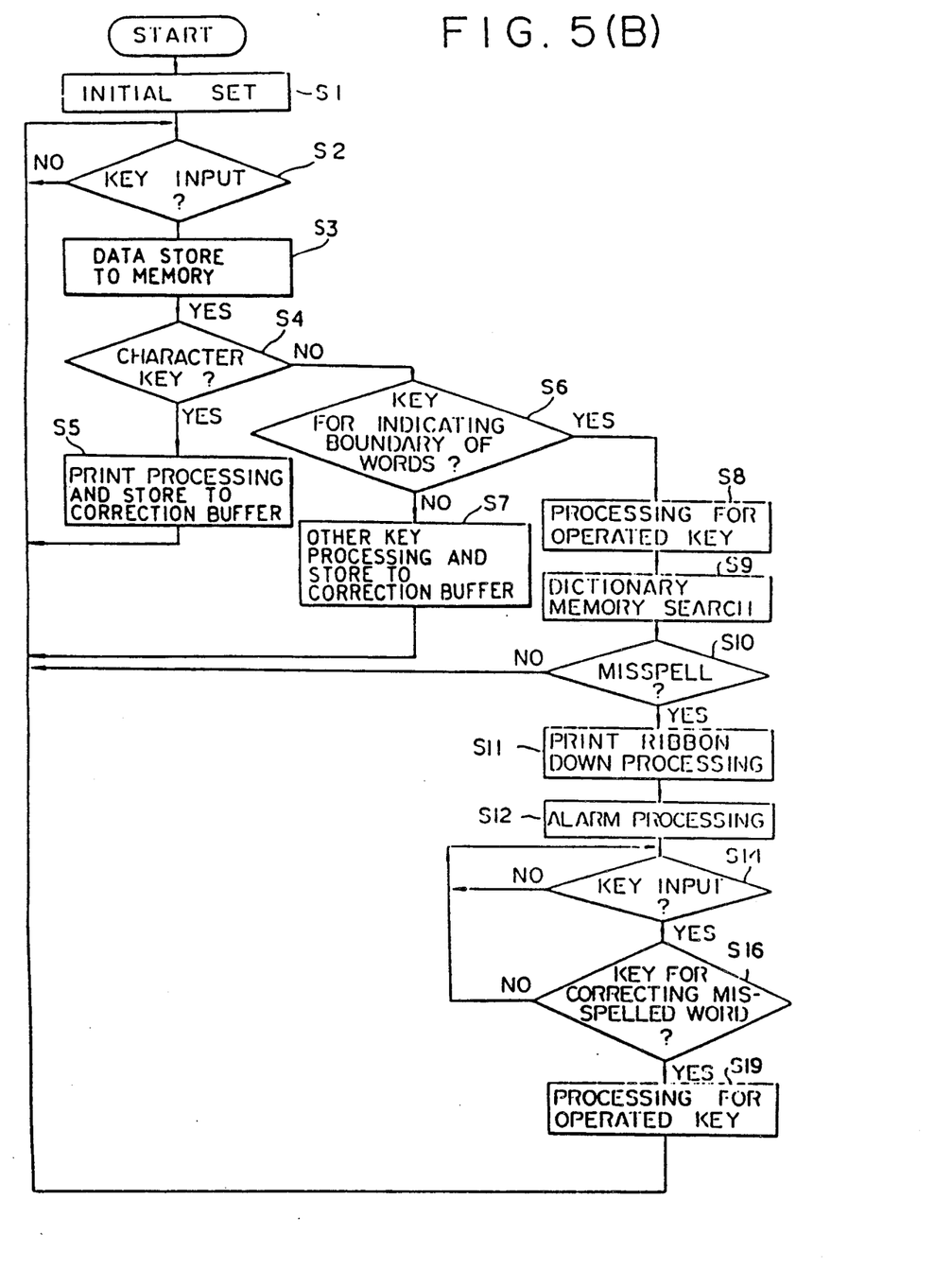

Next, a program stored in the program memory 74 of the ROM 64 which controls the above control circuit 68 will be described below with reference to flowcharts shown in FIG. 5 (A) and (B).

Note that these flowcharts show the cases of the above typewriter mode, wherein initialization is effected by the application of power at step S1 and the flow is in an input wait condition at step S2. Then, when one of the character key 5 (for example, a key of "A") is depressed, and the data corresponding to the depressed key are stored in the input buffer memory 82 at S3, a print processing is executed at step S5. More specifically, the type-wheel drive motor 100 rotates the type-wheel 34 in response to an instruction from the CPU 62 and to select the character "A" and the ribbon lift cam drive motor 109 forwardly drives the ribbon lift cam 52 to lift up the print ribbon 40 to the print position and further the "A" is printed by the strike of a hammer by actuating the solenoid 38. After that, the carriage 32 is moved by a character and the print ribbon 40 is wound by the ribbon feed motor 108 after the printing is completed.

When the operated key is not one of the character keys 5, it is determined at step S6 whether the key is one of word separation keys (the space key 10, the return key 14, the period key 6, the comma key 7, the colon key 8 or the like) or not. When it is not the separation key, other key processing is executed at step S7, whereas it is the word separation key, a processing corresponding to the separation key is executed at step S8. For example, when it is the space key 10, the carriage 32 is moved by a single character in a non-printing state.

Then, the dictionary is searched at step S9 and it is determined at step S10 if any printed word is incorrectly spelled. More specifically, it is checked if the same word as a printed word specified by the separation keys depressed in front of and behind the word is contained in the dictionary memory 76. When the word having the same spelling as the printed word exists, it is determined that the printed word is not incorrectly spelled and the flow returns to step S2. When the word of the same spelling is not exists, however, it is determined that the printed word is incorrectly spelled and the flow goes to step S11.

A ribbon lowering processing is executed at step S11 wherein the ribbon lift cam drive motor 109 is operated in response to an instruction from the CPU 62 and the ribbon lift cam 52 is reversely rotated, i.e., in the counterclockwise direction in FIG. 2, whereby the ribbon cassette 42 is rotated downwardly against an urging force of the spring 48 through the holder 44 and the print ribbon 40 is lowered to the rest position apart downwardly from a print line. As a results, the operator can visually confirm words on the print line without being obstructed by the print ribbon 40. Succeeding to the execution at step S11, an alarm processing is executed at step S12 to give an alarm by a buzzer, a lamp or the like, and further, a timer 83 provided on the RAM 66 begins to count a period of time at step S13 after the above detection of misspelled word.

After the word incorrectly spelled is detected, it is determined at step S14 if an key input is succeedingly carried out. At step S15, by depressing one of keys 5, the code data of the input key are stored in the input buffer memory 82 when the operator continuously input data regardless of the alarm of the incorrectly spelled word, this determination is "YES" and then the flow goes to S15 to determine if the input key is a key, for example, such as the back space key 10, the correction key 16 or the like for correcting the incorrectly spelled word. When the key input operation is carried out to input the spelling of a usual word, this determination is "NO" and then the flow goes to step S20 where the content of the input, i.e., the data inputted by the key is displayed on the liquid crystal display 4 and the print processing corresponding to the input key is not executed. More specifically, the typewriter mode is temporarily changed to the memory mode and the operation of the print mechanism such as the carriage 32 and the like is interrupted.

At step S21 succeeding to the above step, it is determined if a prescribed period of time has elapsed after the detection of the incorrectly spelled word. When the period of time has not elapsed, the flow returns to step S14. At step S21, it is determined if a predetermined period of time has elapsed to enable the operator to recognize the incorrectly spelled word by the alarm or the like. In other words, even if an alarm informing of an incorrectly spelled word is given in the condition that the operator continuously carries out a key input, a processing corresponding to a memory is successively executed at step S22 after the predetermined period of time has elapsed at step S21 without a correction operation since a word of spelling which is not contained in the dictionary memory 76 (for example, a person's name, a place name or the like or a word intentionally inputted by the operator) is not incorrectly spelled even if it is not contained therein. That is, the code data of the keys stored in the input buffer memory 82 is printed together.

On the other hand, when it is determined that a key input is carried out at step S16 to correct an incorrectly spelled word (the operation of the back space key 12, the correction key 16 or the like) just after the timer 83 is begun to operated at step S13 or after several key inputs in the loop of steps S14, S15, S16, S20 and S21, this is the operation carried out by the operator to correct the incorrectly spelled word who has recognized it by the alarm of the incorrect spelling. At the time, data which is inputted at S16 after the input of the incorrectly spelled word, i.e., key data stored in the input buffer memory 82 at steps S15 is canceled and the characters displayed on the liquid crystal display 4 are erased at step S18, and further a processing corresponding to the input key for the correction thereof is executed at step S19. For example, assuming that the correction key 16 is depressed in the condition that the print head of the carriage 32 confronts the incorrectly spelled portion, the clockwise rotation of the ribbon lift cam 52 in FIG. 2 and the release of the action of the above stopper cause the cam follower 50 to be engaged with the cam groove 58, whereby the correction ribbon 56 is lifted to the position where it confronts a print line, a strike processing of an incorrect character is executed based on the data stored in the present position memory 78 and the correction buffer memory 80 thereby to strip off the incorrect portion to the side of the correction ribbon 56. After that, a correct character can be printed.

As described above, when the occurrence of an incorrectly spelled word is determined, the print ribbon 40 is lowered from the print position to the rest position even if an input is continuously carried out so that the operator can easily confirm where incorrect spelling exists.

In the embodiment described above, although key data input in a predetermined period of time after the determination of the input of an incorrectly spelled word is not printed, it is temporarily stored in the memory to accept the input. Further, it may be considered, in FIG. 5(A), that the inputted data after the misspelled word are not canceled at step S17 and not erased at step S18, i.e., the data inputted after the misspelled word, by a fast input operations, are used after a correction operation of the misspelled word. It is possible, however, to compose a program, as shown in FIG. 5(B), which does not accept data input other than data corresponding to an instruction for correcting the misspelled word after the determination of the input of the incorrectly spelled word.

In addition, the print mechanism and the ribbon lift mechanism are not limited to the above embodiment but various types of known mechanism can be employed.

It should be understood that this invention can be achieved in the modes to which various changes and modifications are applied based on the knowledge of a person skilled in the art.

What is claimed is:

1. A printing device comprising input means for inputting character data, print means including a print head member moveable along a print line on a print sheet, for executing print operations through a print ribbon in response to the inputted character data, said printing device further comprises:
    dictionary memory means for storing spelling information of a multiplicity of words;
    spelling check means for checking the spelling of a character string defined in a predetermined manner and having been printed on said print sheet, by retrieving the words stored in said dictionary memory means;
    first control means for controlling said print means so as to cease the print operation in case that a word whose spelling is equal to the character string checked by said spelling check means is not stored in said dictionary memory means;
    memory means for storing the data inputted after said print means is so controlled to cease the print operations by said first control means;
    count means for counting a period of time after a detection of misspelling of the character string executed by said spelling check means; and
    print control means for controlling said print head member so as to execute print operations in response to the data stored in said memory means in case that a value counted by said count reaches a predetermined value.

2. The printing device according to claim 1 wherein the cease operation executed by said first control means is a shift operation of said print ribbon from a print position to a rest position.

3. The printing device according to claim 1 wherein said print control means further controls said print head member so as to successively execute print operations after the print operations corresponding to the data having been stored in said memory means.

4. The printing device according to claim 1 which further comprised second control means for the controlling said print head member so as to be operated in response to a predetermined data in case that said predetermined data is inputted before the value counted by said count means reaches said predetermined value.

5. The printing device according to claim 1 which further comprises display means for displaying the characters corresponding to the data stored in said memory means.

6. The printing device according to claim 4 wherein said operation executed by said second control means is a correction operation of the character string having been printed on said print sheet.

7. The printing device according to claim 6 wherein said correction operation is print operations overlapping with said character string through a correction ribbon.

8. The printing device according to claim 1 which further comprises alarm means for alarming in case that said print ribbon is so controlled to be shifted by said first control means.

9. The printing device according to claim 7 wherein said alarm means comprises a buzzer for generating an audible alarm signal.

* * * * *